United States Patent [19]

Wagaman

[11] Patent Number: 4,956,168

[45] Date of Patent: Sep. 11, 1990

[54] SYNTHESIS OF HYDROXYLAMINE SALTS

[75] Inventor: Kerry L. Wagaman, Clinton, Md.

[73] Assignee: The United States of America as represented by the Secretary of the Navy, Washington, D.C.

[21] Appl. No.: 470,814

[22] Filed: Jan. 28, 1983

[51] Int. Cl.$^5$ .............................................. C01B 21/14
[52] U.S. Cl. ..................................... 423/386; 423/387
[58] Field of Search ................ 423/386, 387, 545, 551

[56] References Cited

U.S. PATENT DOCUMENTS

| | | | |
|---|---|---|---|
| 3,145,082 | 8/1964 | Rausch et al. | 423/387 |
| 3,313,595 | 4/1967 | Jockers et al. | 23/117 |
| 3,420,621 | 1/1969 | Walters et al. | 23/85 |
| 3,508,864 | 4/1970 | Thompson et al. | 23/85 |
| 3,695,834 | 10/1972 | Wheelwright | 423/395 |
| 4,147,623 | 4/1979 | Koff et al. | 423/387 |
| 4,166,842 | 9/1979 | Tunick et al. | 423/387 |
| 4,202,765 | 5/1980 | Koff et al. | 423/387 |
| 4,335,091 | 6/1982 | Scholz et al. | 423/387 |
| 4,507,248 | 3/1985 | Mathew et al. | 423/387 |
| 4,551,323 | 11/1985 | Mathew et al. | 423/387 |
| 4,551,324 | 11/1985 | Mathew et al. | 423/387 |
| 4,707,294 | 11/1987 | Mathew | 423/387 |

OTHER PUBLICATIONS

Agladze et al., *Chem. Abs.*, 67, Abs. #17396q (1967).

*Primary Examiner*—Edward A. Miller
*Attorney, Agent, or Firm*—John D. Lewis; Kenneth E. Walden

[57] ABSTRACT

Hydroxylamine perchlorate or nitrate is prepared by forming an alcohol-hydroxylamine solution from reacting a slurry of hydroxylamine sulfate in alcohol with ammonia, reacting perchloric acid or nitric acid therewith to form the desired salt, and separating the salt.

14 Claims, No Drawings

SYNTHESIS OF HYDROXYLAMINE SALTS

BACKGROUND OF THE INVENTION

The invention pertains generally to inorganic synthesis and in particular to synthesis of energetic oxidizer salts.

A liquid propellant is referred to as a monopropellant, if the oxidizer is kept with the fuel, or as a bipropellant, if the oxidizer is kept separate until the two are reacted. Presently three liquid oxidizers are used except for special applications such as in propellants for outerspace travel. The first oxidizer, a 90 percent aqueous solution of hydrogen peroxide, has serious stability problems and is therefore difficult to store. Inhibited red fuming nitric acid (IRFNA) is extremely toxic and corrosive. The third oxidizer, 70 percent perchloric acid, has extremely corrosive reaction products and is toxic. These disadvantages of the oxidizers have restricted the use of liquid propellants for rockets, gun systems, and torpedoes.

Aqueous solutions of hydroxylamine salts of perchloric or nitric acid have been shown to be excellent energetic oxidizers for general purpose rockets, gun systems, and torpedoes. The solutions are very energetic, stable, insensitive, and have low freezing points. Many liquid propellant formulations with one of these oxidizers have freezing points below $-25°$ C. The oxidizer solutions themselves have freezing points around $-18°$ C. Hydroxylamine nitrate (HAN) has an additional advantage of producing no corrosive products of combustion; however, this oxidizer is less energetic and stable than hydroxylamine perchlorate (HAP). The major disadvantage and the main reason for the virtual nonuse of these oxidizers, in the past, is their cost.

Recently HAN has been commercially prepared by a batch electrolytic method on a small scale at a reasonable cost. The disadvantages of the method are the large requirements for electricity, batch operation, equipment costs, and scale of operation. This method would be inappropriate for a large production, and it can not produce the more important oxidizer, HAP. Hydroxylamine salts have been prepared, in the laboratory, by an electrolytic method described in CA 17396q 67 (1967). This method would produce a product extremely high in metallic contaminents and is not suitale for large scale production Also HAP cannot be prepared by this method.

Presently no method exists which can produce HAP at a cost low enough for this oxidizer to be utilized in propellants other than small specialty propellants and no method exists which can produce HAN continuously on a large scale at a low cost. The existing methods have one or more disadvantages, causing the cost of the oxidizers to be too high. Often water is utilized as a solvent, causing serious problems with metallic and other ionic contaminations in the product even after extensive purification. These contaminants can interfere with the performance and stability of the oxidizer. Another common problem is that the product stream is too dilute, therefore requiring expensive distillation or other concentration techniques. On account of the corrosiveness of the reactants, the process equipment for some methods must have glass and glass-lined equipment. Other methods require toxic and/or flammable organic reactants. Often the methods involve many processing steps or long processing times, again increasing the overall cost of the product too much.

The oxidizers are presently prepared by three general methods: aqueous sulfate precipitation, anhydrous precipitation and ion exchange Each process has one or more features that greatly increase costs.

In the aqueous precipitation process a saturated aqueous solution of hydroxylamine sulfate is combined with a saturated aqueous solution of sodium, calcium or barium nitrate or perchlorate. These reactions result in the formation of a very difficult-to-filter sulfate precipitate and of an aqueous solution of either hydroxylamine nitrate (HAN) or hydroxylamine perchlorate (HAP). In the case of HAN the concentration is about 15%. Since most of the useful concentrations of these oxidizers are in the 50 to 85% range, water has to be removed by the costly process of distillation. Because the sulfate is difficult to precipitate, residual metal contaminants are present in high concentrations in the final product.

Two methods are disclosed in U.S. Pat. No. 3,420,621 by Watters et al which employ the anhydrous precipitation technique. By this first method, an alcoholic slurry of hydroxylamine sulfate (HAS) is neutralized with alcoholic caustic, resulting in the formation of water as a reaction product. After filtering, the resulting free amine solution is then neutralized with an acid-water mixture. If an aqueous solution of the resulting hydroxylamine salt is desired, the alcohol can be removed by evaporation. In the second method, an alcoholic solution of sodium perchlorate is reacted with an alcoholic solution of hydroxylamine hydrochloride at 50° C. with agitation. After cooling, the sodium chloride precipitate is removed by filtration, leaving a 21% solution of HAP in alcohol. If an aqueous solution of the hydroxylamine salt is desired, water is added and the alcohol is removed by distillation. Hydroxylamine hydrochloride is relatively soluble in methanol but is not available commercially. Hydroxylamine sulfate (HAS) is commercially available but cannot be substituted in this reaction because it is insoluble in alcohols. Both of these syntheses use a flammable and toxic solvent (methanol). Also, a very flammable ether must be added to the alcohol-HAP mixture to precipitate the inorganic impurities.

Two examples of the ion-exchange technique which have been used are disclosed in U.S. Pat. No. 3,508,864 by Thompson et al and in U.S. Pat. No. 3,695,834 by Earl J. Wheelwright. In Thompson et al HAP is prepared by using ion exchange resins to separate interfering ions from the starting hydroxylammonium and perchlorate reactants. In both processes, an excess of acid is used, causing problems of stability and corrosion. Also free perchloric acid can cause a secondary combustion after a torpedo has been fixed. This event presents a serious hazard to personnel in collecting and recharging fired torpedoes. In addition to those problems, organic contaminants from resin degradation are often present in the final product.

Another salt, i.e. sulfate, of hydroxylamine has been prepared by a catalytic reduction of nitric oxide with hydrogen in contact with a platinum catalyst and dilute sulfuric acid. The method is taught in U.S. Pat. No. 3,313,595 by Jockers et al. This synthesis technique has not been successful with the nitrate and perchlorate salts.

SUMMARY OF THE INVENTION

It is, therefore, an object of the present invention to prepare hydroxylamine perchlorate (HAP) or nitrate (HAN) at a low cost in high yield and purity.

A further object is to prepare HAP or HAN using nonaqueous solvents and with relatively nontoxic and nonflammable chemicals.

A still further object is to prepare HAP or HAN with stainless steel equipment.

Another object is to prepare HAP or HAN quickly with few processing steps.

These and other objects are achieved by preparing a hydroxylamine-alcohol solution from a reaction between ammonia and hydroxylamine sulfate in an alcohol-hydroxylamine sulfate slurry, reacting the hydroxylamine-alcohol solution with nitric acid or perchloric acid to produce a hydroxylamine salt, and separating the salt.

DETAILED DESCRIPTION OF THE INVENTION

The fullest benefit of the present invention is obtained by reacting relatively inexpensive and available materials in alcohol to synthesize a hydroxylamine acid salt rather than reacting the intermediate, hydroxylamine, with an acid to obtain the salt. Ammonia is especially cheap and plentiful. It has been determined that it is possible to achieve the required high-degree purity with the method of the present invention although several reactions are involved, hydroxylamine sulfate is virtually insoluble in alcohol, hydroxylamine has a low solubility in alcohol, and a reaction with a strong acid occurs in an alcohol solution.

A slurry is prepared by mixing powdered hydroxylamine sulfate with methanol or ethanol. The alcohol is at least 88 percent concentrated and preferably is 95 percent. Methanol or ethanol is relatively nontoxic and nonflammable and has a boiling point lower than that of water but is not too low. The preferred loading of hydroxylamine sulfate is from 10 to 14 weight percent and most preferably from 11 to 13 percent of the total slurry weight. Although any loading can be used, the preferred loadings produce an 11 to 12 percent hydroxylamine solution. This concentration has been found to avoid contamination and separation problems The above concentrations are preferred for both methanol and ethanol solutions, even though hydroxylamine solubility in methanol is about 35 percent as opposed to about 15 percent for ethanol.

In order to have a high yield, the particle size of the sulfate is less than about 40 microns and preferably less than 10 microns or the slurry is mixed with a high-shear mixer. If the particles are larger, e.g. ranging up to 600 microns, high shear mixing would reduce the particle size and remove the costly build up with ammonium sulfate, a reaction by-product Even if high-shear mixing is not used, the slurry is agitated during and after the addition of ammonia to the slurry. The temperature of the slurry before and during the addition of ammonia to the slurry is not in excess of about 65° C., preferably from 35° to 55° C., and most preferably from 40° to 50° C. If the temperature is too high, an excessive amount of ammonia is dissolved in the final product mixture If the temperature is too low, the reaction proceeds too slowly. With the temperature range from 40° to 50° C., the reaction proceeds quickly and almost no ammonia is dissolved in the final product mixture The heat of solution of ammonia in alcohol might necessitate cooling means to be added in order to maintain the desired temperature.

Ammonia can be added by bubbling ammonia gas through the slurry in an amount not in excess of about two weight percent over stoichiometry, preferably not in excess of 0.5 weight percent over stoichiometry, and most preferably in a stoichiometric amount or an amount up to 0.2 weight percent over stoichiometry. Alternatively ammonia can be added in the above amount as liquid ammonia having no more than 10 weight percent of water and preferably no more than 5 weight percent. Alcohol solutions of ammonia can be used. The amount of ammonia is kept at or near stoichiometry because ammonia also reacts with the acid reactant to form an alcohol-insoluble ammonium salt which adheres to the particles of hydroxyl ammonium sulfate and unreacted ammonia is soluble in the product mixture.

If too much ammonia is added and the product mixture is contaminated, it is possible to neutralize the ammonia with sulfuric acid, although this reaction would result in the production of insoluble ammonium sulfate. The ammonium salt can however be easily removed by filtration. Excess ammonia in the product can be minimized by keeping the temperature in the preferred temperature range. Another technique is applying a water-aspirator vacuum or mechanical vacuum pump while the reaction mix is agitated.

The hydroxylamine-solution stage of the subject process could be easily continuous in the following manner. The hydroxylamine sulfate solids would be slurried in an alcohol by use of an agitated holding tank or a screw feeder This slurry would then be pumped through a pipe to a mixing tee where the gaseous or liquid ammonia would be introduced. The reaction mixture would then be fed through a high-shear, in-line agitator e.g. a Brinkman Polytron Homogenizer or a Tekmar homogenizer where the reaction would be initiated. The resulting reaction solution could then be cooled in a heat exchanger or in a a cooled, agitated holding tank. The solution temperature should be maintained from 35° to 55° C. The by-product ammmonium sulfate would be slurried in the alcohol-hydroxylamine solution and would then be passed to a centrifuge or a scraped-wall filter where these solids would be separated and removed continuously, producing a solution of hydroxylamine in alcohol. Obviously numerous other methods exist for making this stage continuous Preferably ammonium sulfate is removed from the reaction mix before the acid reactant is added. Removal can be effected by a simple filtration. The insolubility of the salt allows removal by many other techniques If an acid other than sulfuric acid, such as perchloric acid, is used to neutralize an excess of ammonia, the resulting salt would also be filtered out.

The exothermic reaction of hydroxylamine with perchloric or nitric acid proceeds very rapidly even at low temperatures. In order to minimize the possible side reaction of the acid with the alcohol and also the decomposition of hydroxylamine, the acid is added under vigorous agitation at a temperature of less than about 55° C. and preferably less than 40° C. It is preferred that the temperature is not kept below 25° C. because of the increased cooling costs. The acid is preferably added in a stoichiometric amount. If less than a stoichiometric amount is added, unstable free hydroxylamine is present. An excess of the acid would be wasteful and could present corrosion problems.

If the acid is an aqueous solution, the acid has a concentration from about 60 to about 75 percent and preferably from 60 to 72 percent. The preferred conncentrations are commecially the most available and ones which have fewer side reactions and contamination problems. To prevent a side reaction between the alcohol and the acid, an amount of water at least equal to about 33 weight percent of the acid should be initially present or be added with the acid. For this reason, acid concentrations in excess of 75 percent and nonaqeous acid solutions give no benefit and can cause problems.

After the reaction is complete a mixture of alcohol water (a neutralization by-product) and a hydroxylamine salt. Alcohol is removed by, e.g. vacuum distillation. Another alcohol, such as propanol or butanol, can be added to the mixture to remove water as an azeotropic mixture. Since most uses of HAP and HAN are as aqueous solutions, water would not have to be removed.

In order to make this stage of the synthesis continuous, the hydroxylamine-alcohol mixture could be passed through a cooled heat exchanger to lower the temperature of the solution to about 0° C. The hydroxylamine could then be passed through a mixing tee where an equimolar amount of acid is introduced. This mixture could then be agitated by passing it through an in-line agitator or through a packed column. The resulting salt-alcohol-$H_2O$ mixture could then be passed into a vacuum distillation column where the alcohol is removed and the still pot bottoms would consist of the desired salt-$H_2O$ solution. If a higher concentration of salt would be desired, more water could be removed by further distillation. The resulting salt-water mixture may contain some residual ammonium perchlorate (AP) solids and would have to be cooled in another heat exchanger to −15° C., to precipitate the AP. The final solution would again be passed through a continuous centrifuge or filter and then sent for packaging and analysis.

Having described the invention in general the following examples are given by way of illustration It is understood that the examples do not limit the description of the invention or the claims to follow.

EXAMPLE I

Synthesis of Hydroxylamine Perchlorate

A slurry of 20 kg hydroxylamine sulfate in 76 liters of 95% ethanol (5% water) was agitated for one hour with a Gifford-Woods Colloid Mill. The average particle size of HAS was about 40 micrometers. The slurry was transferred to a 114-liter stainless steel batch reactor. A high-shear Brinkmanm Homogenizer with a 115 mm stator agitated the slurry. A stoichiometric amount of an ethanol solution of ammonia was added. The reaction was complete after ten minutes. Fifty six liters of 11 percent hydroxylamine (HA) in ethanol solution was recovered by vacuum filtration with an immersion filter. Approximately 19 of the 76 liters of solvent were retained on the filter cake which typically consists of 19 liters of ethanol, 1.7 kg HA, two kg unreacted HAS and 15 kg ammonium sulfate. This 25 percent loss of HA solution, coupled with a ten percent loss of product because of unreacted HAS, lowered the overall yield for this synthesis to about 68 percent.

Nineteen liters of ethanol were then added to the filter cake. The slurry was agitated for about five minutes and then filtered under vacuum using an immersion filter. Nineteen liters of solvent were retained on the filter cake and 19 liters of filtrate were recovered. Half of the previously retained HA was recovered in the filtrate which raised the overall reaction yield from 68 to 80 percent. An additional wash with 19 liters of ethanol raised the overall HA yield to about 85 percent, based on reacted HAS. It was concluded that HA was retained because of the presence of the solvent and not because of chemical attraction to the solids in the filter cake. If a centrifuge had been used, the recovery is estimated to be from 90 to 95 percent of the initially available filtrate.

The reactor was charged with the above HA-alcohol solution at a temperature of about 30° C. The Brinkmanm Homogenizer was again used to vigorously agitate thhe solution. A stoichiometric amount of perchloric acid was added and the temperature was allowed to rise to 45° C. The reaction was complete after about ten minutes, giving an almost 100 percent yield.

The mixture of alcohol-water-HAP from the neutralization was distilled under vacuum to remove the alcohol and some of the water. The condensate of the distillation consisted of 83 percent ethanol and 17 percent water. The reasons for the relatively low alcohol concentration were the lack of reflux or distillation column and changes of the activity coefficients due to differences in the solubility of the HAP in the water and the alcohol.

The quality of HAP produced in the above method is shown by a comparison in Table I of this HAP with a commercially available HAP produced by an aqueous precipitation method. This HAP is thermally stable up to 200° C., but the commercially available HAP is stable only up to 180° C.

TABLE 1

| Chemical | Aqueous Precipitation | | |
| --- | --- | --- | --- |
| | Lot 8012 | Lot 8048 | Example 1 |
| HAP | 56.7% | 57.3% | 82.1% |
| Water | 42.4% | 38.0% | 17.4% |
| Excess Perchloric Acid Impuritries | 0.2% | 0.1% | — |
| Na | 0.2% | 1.4% | — |
| Fe | 0.0011% | 0.0026% | 0.0001% |
| Ca | 0.0013% | — | — |
| Mg | 0.0013% | — | — |
| Ni | 0.00008% | 0.00002% | 0.00001% |
| Cr | — | — | 0.000015% |
| Miscellaneous | 0.5% | 3.2% | 0.5% |

EXAMPLE II

Synthesis of Hydroxylamine Perchlorate

Example I was repeated with the exception that the HA-alcohol solution was not isolated. Ammonium sulfate was removed by centrifuging. After washing the centrifuge cake with ethanol, the yield at this stage was 95+ percent.

EXAMPLE III

Synthesis of Hydroxylamine Nitrate

Example II was repeated except that nitric acid was used as the acid reactant. HAN was produced at a yield of 95+% and with a purity comparable with Examples I and II.

The subject synthesis can produce HAP or HAN in yields in excess of 90 percent with a purity in excess of that found in the commercially available salts. The increased thermal stability is probably due to the higher purity. Most importantly, this synthesis produces HAP at a cost of about one half of the lowest-cost method currently being used, thereby making HAP practical for many new applications. By this method, HAN is prepared at a cost slightly lower than the presently available lowest cost without the need of much energy. Further the present method is suitable for high-volume production of both HAP and HAN.

Obviously, many modifications and variations of the present invention are possible in light of the above teachings It is therefore to be understood that, within the scope of the appended claims, the invention may be practiced otherwise than as specifically described.

What is claimed is:

1. A method for preparing hydroxylamine acid salts which comprises:

preparing a slurry of hydroxylamine sulfate in an alcohol at a temperature not in excess of about 65° C.;

high-shear mixing ammonia with said slurry to form a hydroxylamine-alcohol solution and ammonium sulfate while maintaining the temperature of said slurry at or below 65° C.;

removing ammonium sulfate;

agitating said solution;

admixing an acid selected from the group consisting of nitric acid and perchloric acid with said solution at a temperature not in excess of about 50° C. to form said hydroxylamine acid salt; and recovering said hydroxylamine acid salt.

2. The method of claim 1 wherein said slurry is prepared and maintained at a temperature of about 35° to about 55° C.

3. The method of claim 2 wherein said hydroxylamine sulfate has an average particle size of less than about 40 micrometers.

4. The method of claim 2 wherein said alcohol is selected from the group consisting of methanol, ethanol, and mixtures thereof.

5. The method of claim 3 wherein said alcohol is selected from the group consisting of methanol, ethanol, and mixtures thereof.

6. The method of claim 5 wherein said ammonia is admixed in an amount not in excess of about 2 weight percent over stoichiometry, by bubbling ammonia gas through said slurry.

7. The method of claim 5 wherein said ammonia comprises liquid anhydrous ammonia is added in an amount not in excess of about 2 weight percent over stoichiometry.

8. The method of claim 5 wherein said ammonia is admixed in an amount not in excess of 0.5 weight percent over stoichiometry and said average crystal size is not in excess of 20 micrometers.

9. The method of claim 8 wherein said acid is perchloric and is admixed in a stoichiometric amount and the temperature of said solution is maintained at less than 40° C.

10. The method of claim 8 wherein said acid is nitric and is admixed in a stoichiometric amount and the temperature of said solution is maintained at less than 40° C.

11. The method of claim 9 wherein said average particle size is less than 10 micrometers.

12. The method of claim 10 wherein said average particle size is less than 10 micrometers.

13. The method of claim 11 wherein ammonia is added in an amount not in excess of about 0.2 weight percent over stoichiometry.

14. The method of claim 12 wherein ammonia is added in an amount not in excess of about 0.2 weight percent over stoichiometry.

* * * * *